(12) United States Patent
Fuerst et al.

(10) Patent No.: US 9,868,411 B2
(45) Date of Patent: Jan. 16, 2018

(54) BUMPER MODULE

(71) Applicant: GM GLOBAL TECHNOLOGY OPERATIONS LLC, Detroit, MI (US)

(72) Inventors: Fabian Fuerst, Mainz-Kastell/Wiesbaden (DE); Tommy Hechtel, Rüsselsheim (DE); Theobald Hock, Grossostheim (DE); Torsten Radusch, Wiesbaden (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/824,656

(22) Filed: Aug. 12, 2015

(65) Prior Publication Data

US 2016/0046248 A1 Feb. 18, 2016

(30) Foreign Application Priority Data

Aug. 12, 2014 (DE) .......................... 10 2014 011 790

(51) Int. Cl.
| | |
|---|---|
| *B60R 19/02* | (2006.01) |
| *B29C 55/00* | (2006.01) |
| *B60R 19/03* | (2006.01) |
| *B60R 19/18* | (2006.01) |
| *B60R 19/22* | (2006.01) |
| *B29L 31/30* | (2006.01) |

(52) U.S. Cl.
CPC ............ *B60R 19/023* (2013.01); *B29C 55/00* (2013.01); *B60R 19/03* (2013.01); *B60R 19/18* (2013.01); *B60R 19/22* (2013.01); *B29L 2031/3044* (2013.01); *B60R 2019/1846* (2013.01); *B60R 2019/1853* (2013.01)

(58) Field of Classification Search
CPC ....... B60R 19/023; B60R 19/03; B60R 19/18; B60R 19/22; B60R 2019/1846; B60R 2019/1853; B29C 55/00; B29L 2031/3044
See application file for complete search history.

(56) References Cited

U.S. PATENT DOCUMENTS

| | | |
|---|---|---|
| 3,869,167 A | 3/1975 | Muller |
| 4,988,137 A | 1/1991 | Fleming |
| (Continued) | | |

FOREIGN PATENT DOCUMENTS

| | | |
|---|---|---|
| DE | 10354723 A1 | 6/2005 |
| DE | 102009036717 A1 | 2/2011 |
| (Continued) | | |

OTHER PUBLICATIONS

German Patent Office, German Search Report for German Application No. 102014011790.1, dated Apr. 30, 2015.
(Continued)

*Primary Examiner* — D Glenn Dayoan
*Assistant Examiner* — Melissa A Black
(74) *Attorney, Agent, or Firm* — Lorenz & Kopf LLP

(57) ABSTRACT

A bumper module for a vehicle includes at least one shaped part that is unitarily deep-drawn from a sheet material. The shaped part has two connecting flanges facing a back side for fastening to side members of the vehicle and an arch which is pre-curved towards a front side connecting the connecting flanges. At least in lateral portions of the arch, the sheet material is laid into folds, which are elongated from the back side towards the front side.

19 Claims, 4 Drawing Sheets

(56) References Cited

U.S. PATENT DOCUMENTS

| | | | |
|---|---|---|---|
| 5,577,784 A | 11/1996 | Nelson | |
| 5,967,592 A | 10/1999 | Freeman | |
| 6,245,415 B1 | 6/2001 | Keller et al. | |
| 6,406,079 B2 | 6/2002 | Tamada et al. | |
| 6,511,109 B1 | 1/2003 | Schultz et al. | |
| 6,890,011 B2 | 5/2005 | Arvelo et al. | |
| 6,997,490 B2 | 2/2006 | Evans et al. | |
| 7,131,674 B2 | 11/2006 | Evans et al. | |
| 7,172,227 B2 | 2/2007 | Weissenborn et al. | |
| 7,401,823 B2 | 7/2008 | Cate et al. | |
| 7,560,003 B2 | 7/2009 | Naughton et al. | |
| 7,611,175 B2 * | 11/2009 | Tornberg | B60R 19/18 293/102 |
| 7,651,155 B2 | 1/2010 | Tan et al. | |
| 7,879,435 B2 | 2/2011 | Mett et al. | |
| 8,579,080 B2 | 11/2013 | Angelico | |
| 2004/0017089 A1 | 1/2004 | Hunter et al. | |
| 2006/0097539 A1 | 5/2006 | Noisternig et al. | |
| 2007/0257497 A1 * | 11/2007 | Heatherington | B60R 19/18 293/120 |
| 2008/0296164 A1 | 12/2008 | Dajek et al. | |
| 2012/0141764 A1 | 6/2012 | Lee et al. | |
| 2013/0119705 A1 | 5/2013 | Matuschek et al. | |
| 2013/0221709 A1 * | 8/2013 | Mildner | B62D 25/02 296/203.04 |
| 2015/0246653 A1 * | 9/2015 | Wassenhove | B60R 19/03 293/120 |

FOREIGN PATENT DOCUMENTS

| | | |
|---|---|---|
| DE | 102010037462 A1 | 3/2012 |
| DE | 102011008864 A1 | 8/2012 |
| DE | 102011054351 A1 | 4/2013 |
| EP | 1997689 A1 | 12/2008 |
| FR | 2898566 A1 | 9/2007 |
| JP | S60169352 A | 9/1985 |
| JP | S62149537 A | 7/1987 |
| JP | H06144133 A | 5/1994 |
| WO | 03104030 A2 | 12/2003 |

OTHER PUBLICATIONS

A.T.Beyene, E.G.Koricho, G.Belingardi, B.Martorana; Design and Manufacturing Issues in the Development of Lightweight Solution for a Vehicle Frontal Bumper; International Symposium on Dynamic Response and Failure of Composite Materials (2014).

* cited by examiner

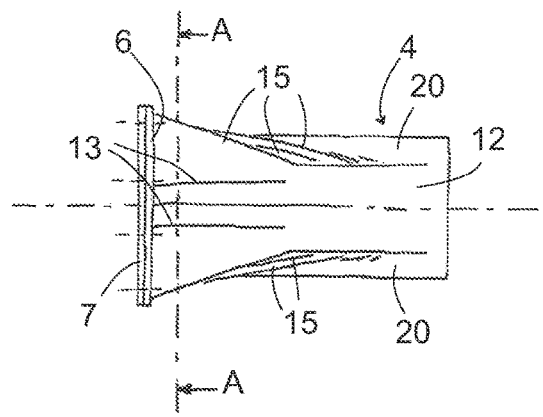
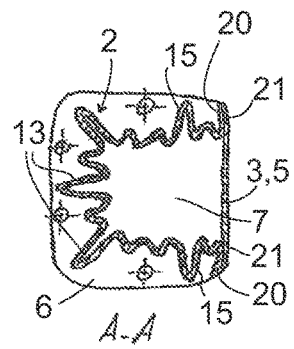
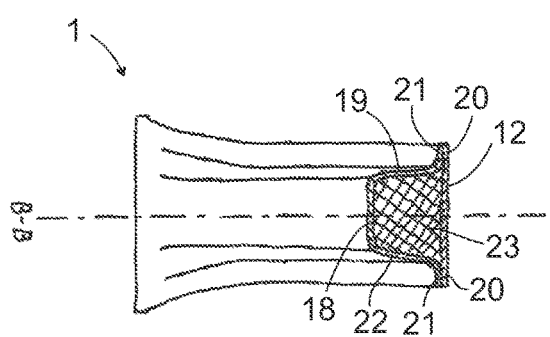
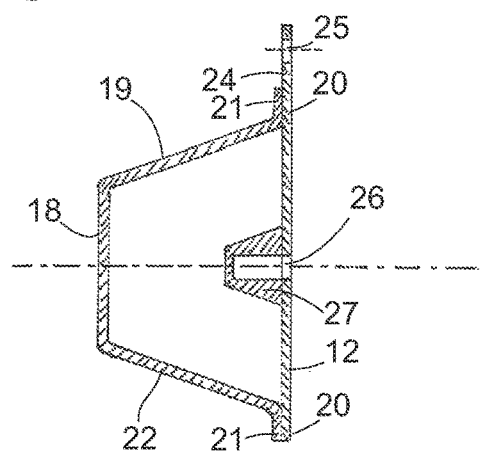
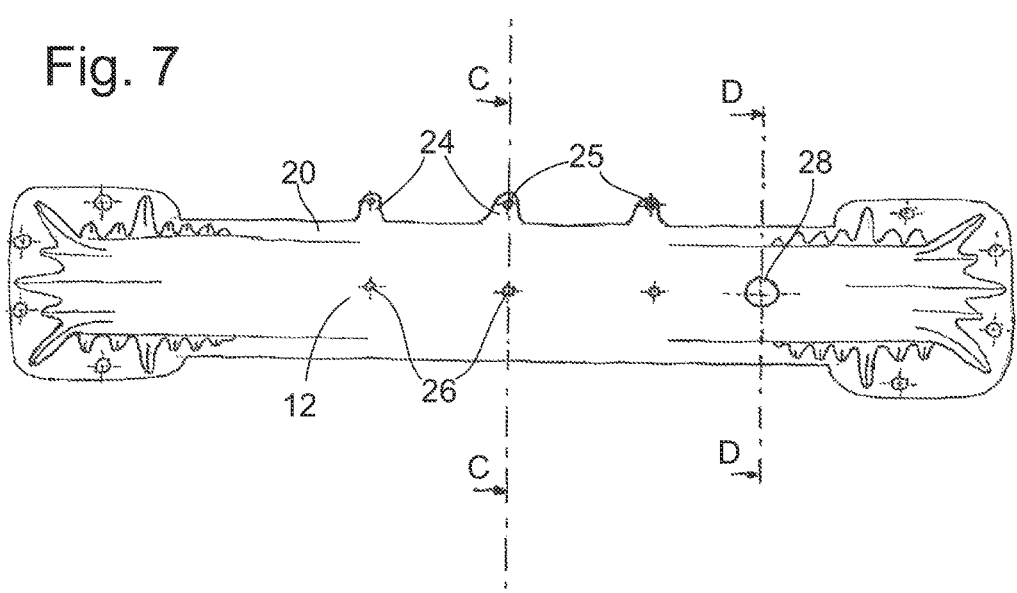

BUMPER MODULE

CROSS-REFERENCE TO RELATED APPLICATION

This application claims priority to German Patent Application No. 102014011790.1, filed Aug. 12, 2014, which is incorporated herein by reference in its entirety.

TECHNICAL FIELD

The present disclosure pertains to a bumper module for a vehicle, in particular a bumper module having a unitarily deep-drawn shaped part of flat material.

BACKGROUND

EP 1 997 689 A1 discloses a bumper cross member, in which an elongated shaped part is obtained by press-molding fiber-reinforced plastic material. Although the fiber reinforcement is important for the mechanical load capacity of the support part, long fibers, which cannot freely move during the press molding, obstruct movement of the plastic matrix in which they are imbedded and uniform filling-out of the press mold. Short fibers can move during the press molding together with the matrix in which they are embedded but do not increase the load capacity of the finished shaped part as efficiently as long fibers, which can continuously extend over a large part of the extent of the shaped part.

Furthermore, EP 1 997 689 A1 fails to disclose the manner in which the bumper cross member is connected to the support structure of a body. Conventionally, such connection includes crash boxes, which are joined in between the cross member and the tips of side members of the body, in order to yield in the case of a collision, thereby protecting the side members from deformation. The connection between bumper cross member and crash boxes has to be over a reasonably large area in order to be able to introduce the forces that occur during a collision from the bumper cross member into the crash boxes, without forces which are narrowly concentrated locally at the connection between bumper and crash box leading to the destruction of the one or other beforehand. The crash boxes and connecting flanges used if appropriate for connecting crash boxes and bumper cross member substantially contribute to the weight of the entire bumper structure, so that even by the use of the plastic cross member described in EP 1 997 689 A1, weight savings can be achieved only to a limited extent.

SUMMARY

The present disclosure provides a bumper module which combines a high energy absorption capacity in the event of a collision with low weight and simple construction. According to a configuration of the present disclosure, the bumper module includes a unitarily deep-drawn outer shaped part of flat material having two connecting flanges facing a back side for fastening to side members of the vehicle and an arch that is pre-curved towards a front side and joins the connecting flanges. In at least a lateral portion of the arch the flat material is laid into folds that are elongated from the back side towards the front side.

The unitary arch shape makes possible an efficient discharge of collision forces via the connecting flanges to the side members such that the folds, at the same time favor that when the lateral portions of the arch yield to the pressure of a collision, numerous bends develop between two halves of the portions and form along the fold for the creation of which substantially more impact energy is consumed than for an individual bend.

In order to make possible forming by deep-drawing, the flat material can include a thermoplastic matrix. A fiber insert reinforcing the flat material can prevent the flat material during deep-drawing from plastically stretching in the area and causing its wall thicknesses decreases as a consequence, or at least greatly limit such stretching. Such limited stretchability of the flat material however of necessity leads to the formation of folds when the flat material is forced into a hollow shape with spherically curved surfaces, and thus in turn favors the desired formation of the folds in the lateral portions. The fiber insert also contributes to the energy absorption during impact, be it through the tearing of individual fibers or by its intact fibers obstructing the propagation of cracks in the matrix and upon sever deformation instead of a breaking of the flat material, permit only a greatly energy-consuming crumbling of the matrix.

The outer shaped part can at least in its lateral portions have a cross section in the manner of a channel that is open towards the back side or towards the vehicle interior, with a top side and a bottom side and an outer wall connecting front edges of top side and bottom side. The folds can be provided on top side and bottom side or on the outer wall, preferably on both.

Preferably, the folds extend as far as to the connecting flanges on the back side of the outer shaped part and divide the same, so that screw holes, which serve for fastening to the side members of a vehicle body, can be effectively arranged on the connecting flanges between folds projecting towards the edge of the connecting flanges to save space. Preferably, the bumper module is reinforced by an inner shaped part which in turn includes an arch which with the arch of the outer shaped part is connected into a hollow member. The two arches can be fastened to one another, in particular glued, welded or otherwise thermally joined along their top and bottom edges.

The arches of the inner shaped part can in a middle portion include a channel-like cross section with a back wall and top and bottom sides projecting from top and bottom edge of the back wall towards the outer shaped part. This allows in particular imparting a greater curvature to the edges of the arches which are connected to one another than the entire hollow member, in this way further improving the load capacity of the bumper module.

In addition, at least one of the shaped parts can be reinforced by injection molded on ribs. Particularly suitable for this is the back wall of the inner shaped part. The inner shaped part furthermore can include flat connecting flanges, on which the connecting flanges of the outer shaped parts are fastened, and which, when the bumper module is mounted on a vehicle, can be accommodated between the connecting flanges of the outer shaped part and the side members.

In order to further increase the load capacity and the energy dissipation capacity of the bumper module, the hollow member can be tilled out by a hard foam body. The outer shaped part can include at least one opening for fastening an outer body part such as for example a bumper outer skin, for accommodating a sensor or the like. In order to evenly distribute the fastening forces that occur on the opening and in particular avoid local overloading in the event of a crash through forces which act between the outer shaped part of the bumper module and the body part, the opening can be backed by a screw dome.

A further subject of the present disclosure is a method for producing a bumper module as described above, with which a flange material cutting is shaped into the outer shaped part by deep drawing. A contraction of the flat material cutting transversely to the drawing direction caused through the deformation during the deep drawing favors the formation of the folds.

A hard foam body can be used as part of a mold for deep drawing the outer and/or the inner shaped part. Here, the hard foam body can be used in the already set state and serve as a die which presses the shaped part concerned into a female die, however it is also conceivable to allow the hard foam to expand in a mold containing one or two flat material cuttings, and to form these flat material cuttings into the outer or inner shaped part through the pressure that occurs during the expansion of the hard foam.

BRIEF DESCRIPTION OF THE DRAWINGS

The present disclosure will hereinafter be described in conjunction with the following drawing figures, wherein like numerals denote like elements.

FIG. 4 is a lateral view of the bumper module;

FIG. 5 is a section along the plane A-A shown in FIG. 2 and FIG. 4 respectively;

FIG. 6 is a section along the plane B-B shown in FIG. 3;

FIG. 7 is a front view of a bumper module according to a second configuration;

FIG. 8 is a section through the bumper module along the plane C-C shown in FIG. 7;

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
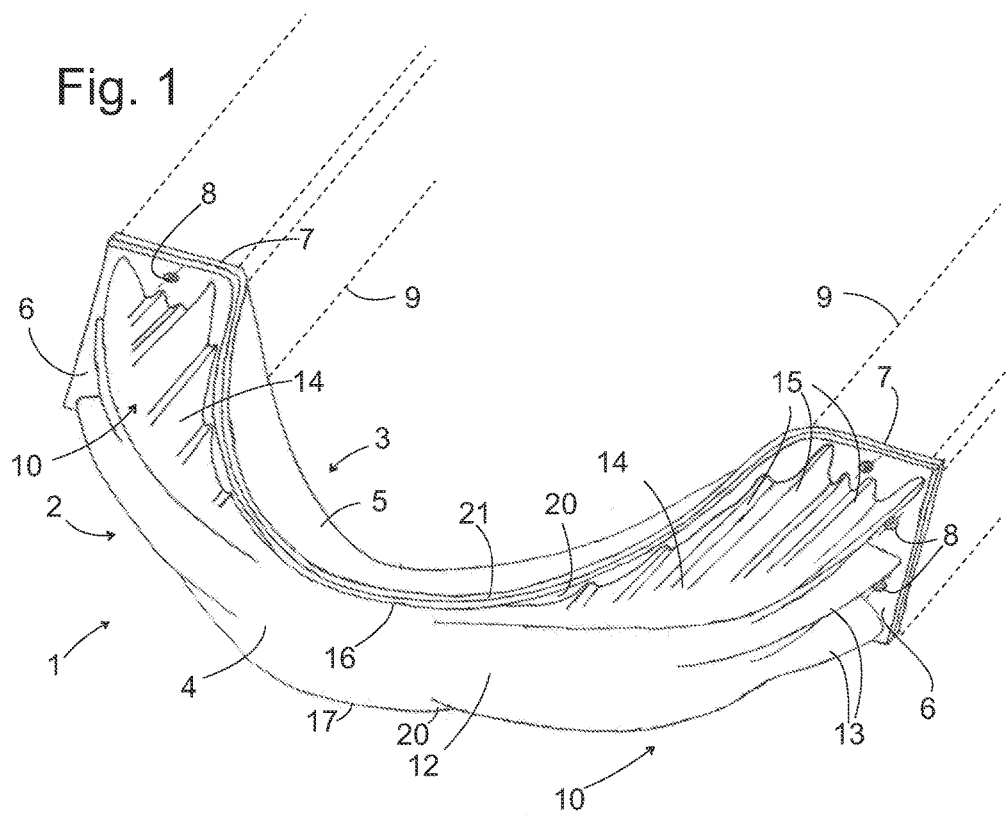
FIG. 1 is a perspective view of a bumper module according to a first configuration.

In a perspective view obliquely from the front, FIG. 1 shows a bumper module 1 according to a first configuration of the present disclosure. The bumper module 1 includes two shaped parts of fiber-reinforced plastic or organic sheet, of which one, making reference to its arrangement on a vehicle, is described as outer shaped part 2 and the other one as inner shaped part 3. Both shaped parts 2, 3 are formed unitarily and include a middle portion each in the form of an arch 4 and 5 respectively and, at the ends of the arches 4, 5, connecting flanges 6, 7, which by pairs abut one another and are intended to be fastened, with the help of screws or the like, which extend through holes 8 of the connecting flanges 6, 7, to side members 9 of a vehicle body which is schematically shown in dashed lines (in FIG. 1).

The plane, in which the connecting flanges 6, 7 extend, is uniformly described here as back side and the opposite side as front side of the bumper module 1 for the sake of simplicity, regardless of whether the bumper module 1 is mounted at the front or rear of the vehicle. The curvature of the arches 4, 5 is such that an apex point on the front side of the outer shaped part 2 is located 20 cm or more in front of the plane of the connecting flanges 6, 7. In this way, space is available for compressing the bumper module 1, in particular in lateral portions 10 of the shaped part 2, which extend in front of the connecting flanges 6, 7 in the event of a collision.

Figure 2:
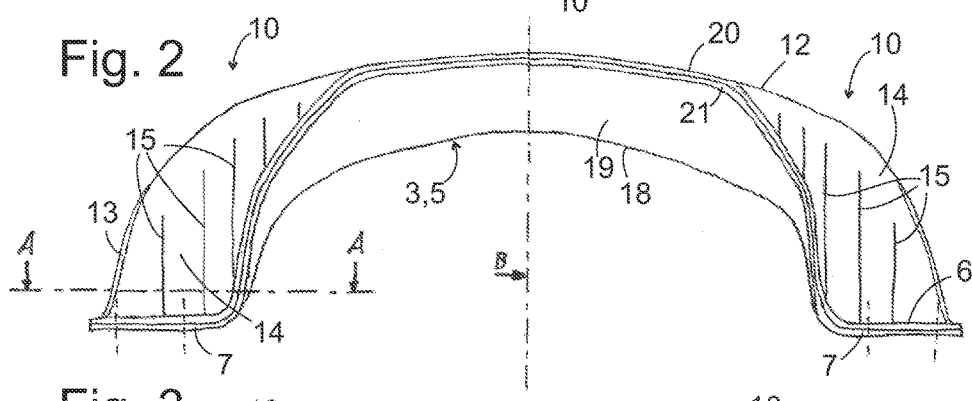
FIG. 2 is a top view of the bumper module.

The outer shaped part 2 includes a substantially vertical outer wall 12, which extends over almost the entire width of the shaped part 2 and in top view is evenly curved as shown in FIG. 2. In the lateral portions 10 of the shaped part 2, folds 13 project in lateral direction R formed in the outer wall 12. A top side 14 of the shaped part 2 that is visible in FIG. 1 is likewise provided with folds 15, which starting out from the connecting flanges 6 extend forward almost up to the outer wall 12. In the middle of the arch 4, the extent of the top part 14 in vehicle longitudinal direction is near zero, top and bottom edges 16, 17 of the shaped part 2 are aligned with the outer wall 12. From this middle, the extent of the top side 14 increases in vehicle longitudinal direction towards the side and reaches its maximum at the transition to the connecting flanges 6. A bottom side of the shaped part 2 that is not visible in FIG. 1 is formed in mirror image to the visible top side 14.

Analogously to the outer shaped part, in the case of which the outer wall 12, top side 14 and bottom side form a channel that is open towards the vehicle interior, the arch 5 of the inner shaped part 3 includes a back wall 18, a substantially horizontal (except for typical demolding chamfer or draft angle) side 19 and a bottom side that is in mirror image thereto, which form a channel that is open towards the outside, towards the shaped part 2. The extent of the top side 19 in vehicle longitudinal direction is largest in the middle of the arch 5 and disappears at the lateral ends of the arch 5 in that the back wall 18 merges into the connecting flanges 7.

From the top and bottom sides of the shaped parts 2, 3 narrow flanges 20, 21 are angled vertically upwards or downwards, which form the abovementioned edges 16, 17. The flanges 20, 21 of the shaped parts 2, 3, just like the connecting flanges 6, 7, are glued to one another, welded together or otherwise thermally joined so that the two shaped parts 2, 3 enclose an arch-shaped elongated hollow space.

Figure 3:
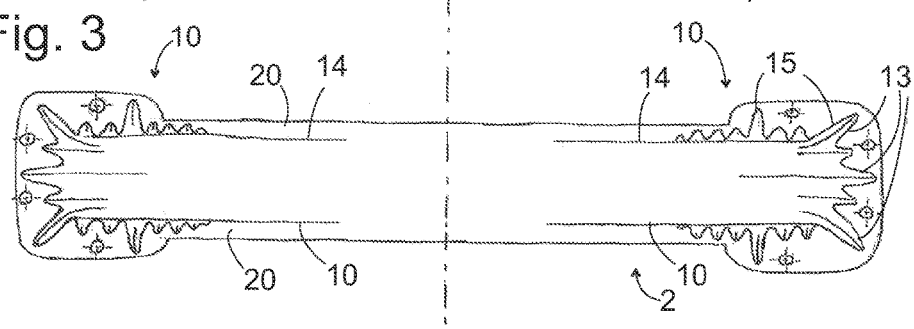
FIG. 3 is a front view of the bumper module.

FIG. 3 shows the outer shaped part 2 in a full frontal view. In the lateral portions 10, the projecting folds 13, 15 are clearly noticeable. These divide the connecting flanges 6 in each case in multiple portions, in each of which a hole 8 is recessed. Horizontal lines, which indicate the course of the top side 14 and the bottom side of the shaped part 2 described here with 10, are interrupted in the middle in order to illustrate that the outer wall 12 is flush here with the flanges 20 adjoining at the top and bottom.

FIG. 4 shows the bumper module 1 in a lateral view. The folds 15 projecting from top and bottom side 14, 10 diverge in the direction of the connecting flanges 6 and thereby ensure a highly tilt-proof support of the arch 4 on the connecting flanges 6.

FIG. 5 shows a section along the plane described A-A in FIG. 2 and FIG. 4. While on the outer shaped part 2 numerous folds 13, 15 are formed, the inner shaped part 3 is substantially flat and extends vertically between the flanges 20. The connecting flange 7 of the inner shaped part closes off the ends of the hollow space formed by the shaped parts 2, 3.

FIG. 6 shows a middle section through the bumper module, along the plane B-B from FIG. 2. Here, the outer wall 12 of the outer shaped part 2 runs flush with the flanges 20, while the inner shaped part 3 has the abovementioned channel shape that is open towards the outside and the flanges 21 through top and bottom side 19 and 22 respectively are offset against the back wall 18.

The hollow space that is enclosed by the two shaped parts 2, 3 can be empty; in the case shown in FIG. 6, it is filled out by a hard foam body 23. The same can contribute to the load capacity of the bumper module on the one hand through its own strength and on the other hand in that the hard foam, when it is allowed to expand in the hollow space delimited by the shaped parts 2, 3, forms an adhesive bond with the shaped parts 2, 3.

FIG. 7 shows a front view that is analogous to FIG. 3 according to a second configuration of the present disclosure. The top flange 20 in this case includes multiple straps 24 projecting upwards in its middle region that is flush with the outer wall 12, which for example by means of holes 25 formed in it, make possible fastening a bumper outer skin (not shown) of a number plate, a support part, which in turn carries a piece of bumper outer skin, a number plate or the like, a cable, a sensor etc. with the help of screws, clips or the like. Holes 26 serving the same purpose can be alternatively or complementarily provided also in the outer wall 12. In order to offer a secure hold for a screw of a clip and in order to prevent, if appropriate, that foam leaks out through the holes 26 when foaming-out the hollow space, these are backed by a screw dome 27 as is evident in FIG. 8.

Figure 9:
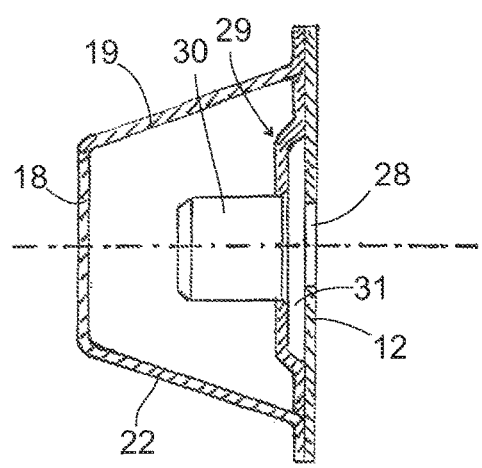
FIG. 9 is a section along the plane D-D shown in FIG. 7.

FIG. 9 shows a section through the bumper module 1 from FIG. 7 along a plane D-D, which runs through a further comparatively large-size hole 28 of the outer wall 12. This hole 28 is backed by a backing part 29, in which a cup 30 aligned with the hole 28 is formed. The backing part 29 and the cup can be formed of metal and the cup 30 can be provided with an internal thread into which a towing eye can be screwed. Alternatively, the cup 30 can also serve for accommodating a radar sensor for parking assistance and a cable duct 31 is formed in the backing part 29, which can accommodate cables for the energy supply and signal output of the radar sensor.

Figure 10:
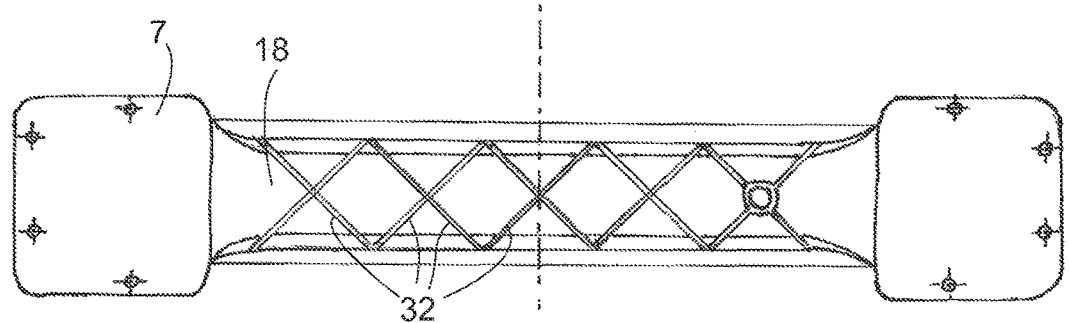
FIG. 10 is a rear view of a bumper module according to a third configuration.

FIG. 10 shows a view of the back side of the bumper module 1 according to a third configuration of the present disclosure. The bumper module 1 in this case is stiffened by ribs 32, which are injection molded onto the back wall 18 of the inner shaped part 3. The ribs 32 can be created by injection molding plastic into a mold that was inserted previously or simultaneously with the deep-drawing of the shaped part 3 from a flat material cutting.

Figure 11:
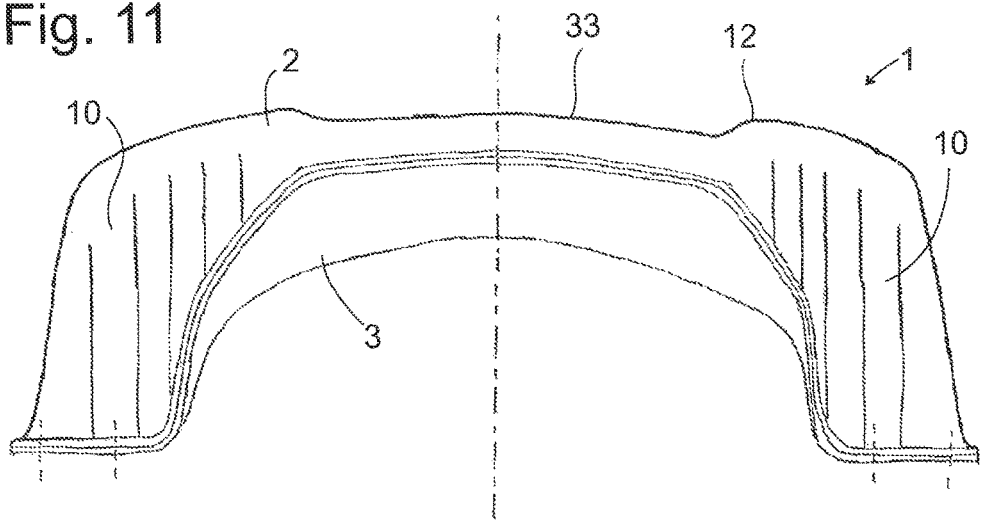
FIG. 11 is a top view of the bumper module according to a fourth configuration.

FIG. 11 shows a top view of a bumper module 1 according to a fourth configuration. The outer wall 12 of the outer shaped part 2 in this case includes on the one hand a central depression 33, which can serve as mounting for a number plate of the vehicle. Lateral portions 10 of the outer shaped part 2 are extended towards the front compared with FIG. 2.

Figure 12:
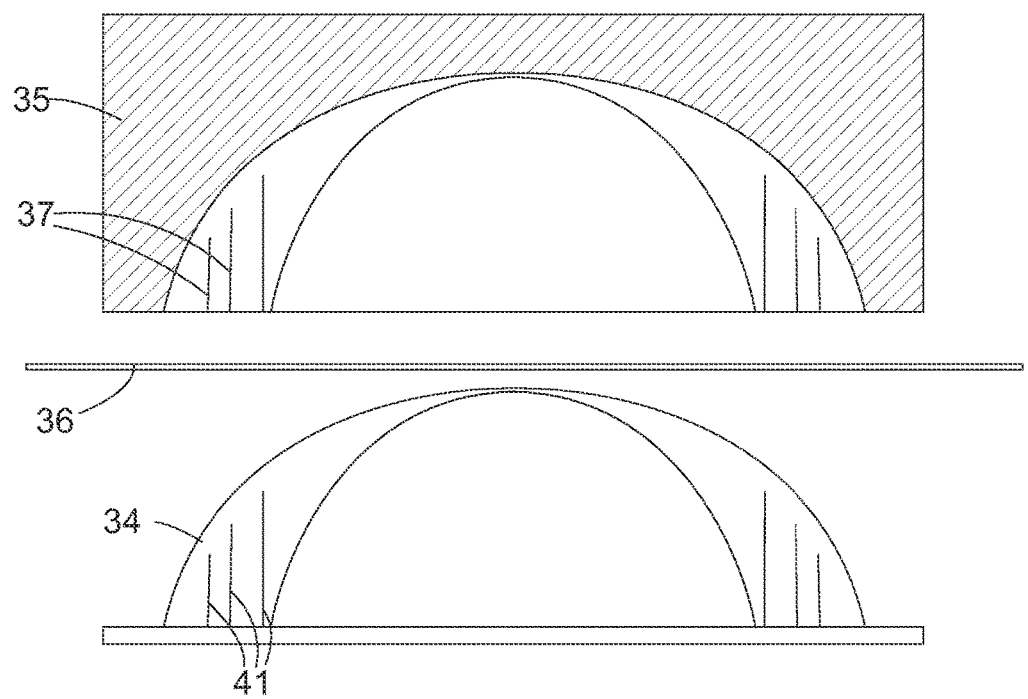
FIG. 12 illustrates molds used for forming the bumper module according to a first configuration of a production method.

FIG. 12 shows schematically a die 34 and a female die 35 and a sheet 36 of fiber-reinforced plastic, which is placed between die 34 and female die 35, in order to be formed into the outer shaped part 2. When die 34 and female die 35 are moved towards one another, a middle region of the cutting 36 initially comes into contact with the tip of the female die 35. Since at this point flange 20 and outer wall 12 of the finished shaped part 2 run in a plane, the sheet 36 can still be bent here about the die 34 substantially without spherical deformation and consequently also without the forming of folds. When the die 34 dips deeper into the female die 35, the ends of the sheet 36, shown in FIG. 12 to protrude over the edges of the female die 35 in FIG. 12, are drawn towards the middle since the sheet 36, because of a fiber reinforcement layer embedded therein, is only stretchable to a minor degree. Since parts of the sheet 36 are now bent over also transversely to the section plane of FIG. 12 in order to form top and bottom side 14 and 10 respectively of the shaped part 2, a spherical deformation occurs which the sheet 36 can now follow in that in the regions of which top and bottom side 14, 10 will be created, folds are formed. The place of the folds and their orientation are preset here by corresponding grooves 37 in the female die 35. The shaped part 2 attains its final shape when the die 34 is fully introduced into the female die 35. For a correct formation of the folds 13, 15 it can proof useful when ribs 41 that are complementary to the grooves 37 are premolded on the die 34, which on introducing the die 34 into the female die 35 press the flat material into the grooves 37.

Analogously, the inner shaped part 3 can be obtained by deep-drawing a sheet of fiber-reinforced material; following this, the flanges 20, 21 and connecting flanges 6, 7 of the two shaped parts 2, 3 are brought into contact with one another and connected to one another by gluing, welding, for example ultrasound welding, or other thermal joining in order to form the complete bumper module 1.

Figure 13:
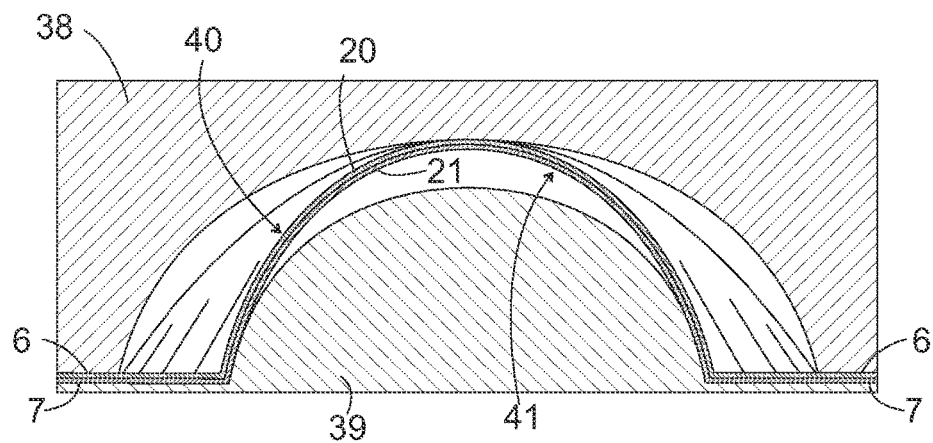
FIG. 13 illustrates molds for forming the bumper module according to a second configuration of the production method.

FIG. 13 shows a cross section through a female die 38 and a die 39, which according to a second configuration of the method are employed for producing the bumper module 1. Female die 38 and die 39 in this case are shown in a stop position in which two sheets 40, 41, of which the shaped parts 2, 3 are to be created, are clamped between them. The sheets are firmly pressed against one another along their edges, in the regions, which will form the connecting flanges 6, 7 and flanges 20, 21 of the finished shaped parts 2, 3; by injecting pressurized gas the central regions of the sheets 40, 41 which are not held pressed together are driven apart, so that the outer sheets 40 hugs the female die 38 forming the folds 13, 15 and the inner cutting 41 the die 39.

Instead of pressurized gas, a hard foam precursor material can also be injected between the sheets in order to drive these apart, press them against die 39 and female die 38 and cure it in the hollow space so created, thereby forming the hard foam body 23.

A prefabricated hard foam body 23 can also be employed as part of the die 33 in the method according to FIG. 12. The sheet 36 is then mounted onto this hard foam body. Following completion of the forming, the finished outer shaped part and the hard foam body that is firmly connected to the same are removed and the die 33 is again completed with a new hard foam body. The assembly of hard foam body and outer shaped part so obtained can in turn serve as part of a female die, in which the inner shaped part is molded and joined to the assembly, in order to obtain the complete bumper module.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A bumper module for a vehicle having an outer shaped part unitarily deep-drawn of a sheet material, the outer shaped part which comprises two connecting flanges facing a back side, wherein each connecting flange configured to fasten with a side member of the vehicle, and an arch pre-curved towards a front side connecting the connecting flanges, the arch having a pair of lateral portions connected to the connecting flanges and a medial portion between the lateral portions, wherein the lateral portions of the arch have the sheet material laid into folds, which are elongated and project outwardly from the arch from the back side towards the front side.

2. The bumper module according to claim 1, wherein the sheet material comprises a thermoplastic matrix.

3. The bumper module according to claim 1, wherein the sheet material is reinforced by a fiber insert.

4. The bumper module according to claim 1, wherein the lateral portion comprise a top side, a bottom side and an outer wall connecting a front edge of the top and bottom sides such that the folds are provided on at least one of the outer wall, the top side or the bottom side.

5. The bumper module according to claim 4, wherein each of the connecting flanges have a screw holes arranged between the folds and projecting towards the edge of the connecting flanges for fastening to the side members.

6. The bumper module according to claim 1, wherein the outer shaped part has at least one opening formed therein for fastening an outer body part.

7. The bumper module according to claim 6, wherein the outer shaped part further comprises a screw dome backing the opening.

8. The bumper module according to claim 1, further comprising an inner shaped part having a second arch portion which is connected with a first arch portion of the outer shaped part to form a hollow member having a void between the inner and outer shaped parts.

9. The bumper module according to claim 8, wherein the first and second arch portions are fastened to one another along respective top and bottom edges.

10. The bumper module according to claim 9, wherein the first and second arch portions are fastened by at least one of gluing, thermally joining or welding.

11. The bumper module according to claim 8, wherein the second arch portion comprises a back wall at least in a middle portion thereof and top and bottom sides which project from a top edge and a bottom edge of the back wall respectively towards the outer shaped part.

12. The bumper module according to claim 8, wherein at least one of the shaped parts is stiffened by at least one injection-molded rib.

13. (Previously Presented The bumper module according to claim 8, wherein the inner shaped part further comprises a flat connecting flange to which the connecting flanges of the outer shaped part is fastened.

14. The bumper module according to claim 8, further comprising a hard foam body filling the void of the hollow member.

15. A method for producing a bumper module according to claim 8, wherein a sheet material is formed into the outer shaped part by deep drawing in a drawing direction and subject to contraction transversely to the drawing direction.

16. A method for producing a bumper module according to claim 15, wherein a hard foam body is used as part of a mold for deep-drawing at least one of the inner shaped part and the outer shaped part.

17. A method for producing a bumper module according to claim 1, wherein a sheet material is formed into the outer shaped part by deep drawing in a drawing direction and subject to contraction transversely to the drawing direction.

18. A method for producing a bumper module according to claim 17, wherein a hard foam body is used as part of a mold for deep-drawing the outer shaped part.

19. A bumper module for a vehicle comprising:

an outer shaped part unitarily deep-drawn of a sheet material, the outer shaped part having two connecting flanges facing a back side, wherein each connecting flange is configured to fasten with a side member of the vehicle, and an arch pre-curved towards a front side connecting the connecting flanges, wherein at least in a lateral portion of the arch the sheet material is laid into folds, which are elongated and project outwardly from the arch from the back side towards the front side;

an inner shaped part having a second arch portion which is connected with a first arch portion of the outer shaped part to form a hollow member having a void between the inner and outer shaped parts; and a hard foam body filling the void of the hollow member.

* * * * *